(12) United States Patent
Zhan et al.

(10) Patent No.: US 12,140,231 B2
(45) Date of Patent: Nov. 12, 2024

(54) ELECTRONIC EXPANSION VALVE

(71) Applicant: ZHEJIANG DUNAN ARTIFICIAL ENVIRONMENT CO., LTD., Zhejiang (CN)

(72) Inventors: Shaojun Zhan, Zhejiang (CN); Guigang Feng, Zhejiang (CN); Qiubo He, Zhejiang (CN)

(73) Assignee: ZHEJIANG DUNAN ARTIFICIAL ENVIRONMENT CO., LTD., Zhejiang (CN)

( * ) Notice: Subject to any disclaimer, the term of this patent is extended or adjusted under 35 U.S.C. 154(b) by 209 days.

(21) Appl. No.: 17/610,165

(22) PCT Filed: May 13, 2020

(86) PCT No.: PCT/CN2020/090039
§ 371 (c)(1),
(2) Date: Nov. 10, 2021

(87) PCT Pub. No.: WO2020/248759
PCT Pub. Date: Dec. 17, 2020

(65) Prior Publication Data
US 2022/0228664 A1 Jul. 21, 2022

(30) Foreign Application Priority Data
Jun. 14, 2019 (CN) .......................... 201920903057.0

(51) Int. Cl.
*F16K 1/36* (2006.01)
*F25B 41/35* (2021.01)

(52) U.S. Cl.
CPC ................ *F16K 1/36* (2013.01); *F25B 41/35* (2021.01)

(58) Field of Classification Search
CPC ... F16K 1/36; F16K 1/32; F16K 31/04; F16K 27/02; F16K 1/482; F25B 41/35;
(Continued)

(56) References Cited

U.S. PATENT DOCUMENTS 2,669,228 A * 2/1954 Bergmann ................ F01L 1/20
123/90.47
4,017,053 A * 4/1977 Wells ....................... F16K 17/10
251/63.4
(Continued)

FOREIGN PATENT DOCUMENTS

CN 108050141 A 5/2018
CN 207470790 U 6/2018
(Continued)

OTHER PUBLICATIONS

Corresponding JP first search results issued on Sep. 9, 2022.

*Primary Examiner* — Craig J Price
(74) *Attorney, Agent, or Firm* — Samson G. Yu

(57) ABSTRACT

Some embodiments of the present invention provides an electronic expansion valve, including: a valve body, the valve body having a valve port; a valve head, movably provided in the valve body, the valve head being configured for blocking the valve port; a rod member, the rod member having a first end and a second end opposite to each other, wherein the first end is provided in a cavity of the valve head in a penetrating manner, the second end has a positioning structure, the positioning structure is configured for positioning a circumference of the rod member, the positioning structure is a positioning flat surface, and the positioning flat surface is parallel to an axis of the rod member; a valve sleeve, provided in the cavity of the valve head.

7 Claims, 4 Drawing Sheets

(58) Field of Classification Search
CPC .... F25B 41/33–35; F25B 41/38; F25B 41/31;
F25B 31/047
USPC ..... 62/222, 159, 160, 205; 251/129.11, 264,
251/265, 129.01–129.22; 236/92 B;
137/1–15.26, 315.01–329.4
See application file for complete search history.

(56) References Cited

U.S. PATENT DOCUMENTS

| | | | | |
|---|---|---|---|---|
| 4,026,326 | A * | 5/1977 | Wells | F16K 17/10 137/625.6 |
| 4,685,488 | A * | 8/1987 | Corbin | F16K 5/201 137/328 |
| 5,261,610 | A * | 11/1993 | Waryu | B05B 1/3053 239/585.4 |
| 6,701,744 | B1 * | 3/2004 | Yajima | F25B 41/35 62/502 |
| 7,494,108 | B2 * | 2/2009 | Inoue | F16K 31/04 251/129.11 |
| 7,854,390 | B2 * | 12/2010 | Hayashi | F25B 41/38 236/92 B |
| 8,061,386 | B2 * | 11/2011 | Mueller | F16L 27/082 285/281 |
| 8,151,824 | B2 * | 4/2012 | Williams | F16K 31/0627 137/625.69 |
| 8,157,183 | B2 * | 4/2012 | Hayashi | F25B 41/35 236/92 B |
| 8,157,184 | B2 * | 4/2012 | Hayashi | F25B 41/38 236/92 B |
| 8,167,000 | B2 * | 5/2012 | Neff | F16K 31/0627 137/625.69 |
| 8,919,369 | B2 * | 12/2014 | Lin | F16K 1/385 137/328 |
| 9,322,582 | B2 * | 4/2016 | Zhan | F16K 39/024 |
| 9,435,457 | B2 * | 9/2016 | Lv | F25B 41/35 |
| 9,689,595 | B2 * | 6/2017 | Zhan | F25B 41/38 |
| 9,726,406 | B2 * | 8/2017 | Sekiguchi | F25B 41/35 |
| 9,810,461 | B2 * | 11/2017 | Zhan | F16K 15/18 |
| 10,267,434 | B2 * | 4/2019 | Mitsu | F16K 31/508 |
| 11,193,596 | B2 * | 12/2021 | Tang | F16K 31/047 |
| 11,274,766 | B2 * | 3/2022 | Lv | F25B 41/35 |
| 11,287,167 | B2 * | 3/2022 | Tang | F16K 31/50 |
| 11,313,601 | B2 * | 4/2022 | Zhang | F25B 41/35 |
| 11,333,415 | B2 * | 5/2022 | Wang | F25B 41/38 |
| 11,473,691 | B2 * | 10/2022 | Dehrmann | F16K 1/36 |
| 11,473,820 | B2 * | 10/2022 | Zhan | F16K 1/422 |
| 11,555,637 | B2 * | 1/2023 | Wang | F25B 41/31 |
| 11,644,118 | B2 * | 5/2023 | Zhan | F16K 1/54 62/528 |
| 11,698,144 | B2 * | 7/2023 | Dixon | F16K 5/0647 251/270 |
| 11,788,642 | B2 * | 10/2023 | Lv | F16K 31/36 251/129.11 |
| 11,796,234 | B2 * | 10/2023 | He | F25B 41/35 |
| 11,953,244 | B2 * | 4/2024 | Zhan | F16K 31/508 |
| 11,959,561 | B2 * | 4/2024 | He | F16K 31/50 |
| 2004/0061082 | A1 * | 4/2004 | Heiling | F16K 31/385 251/30.01 |
| 2022/0341638 | A1 * | 10/2022 | Zhan | F25B 41/35 |
| 2023/0408156 | A1 * | 12/2023 | Zhan | F25B 41/31 |
| 2024/0026986 | A1 * | 1/2024 | Zhan | F16K 25/005 |

FOREIGN PATENT DOCUMENTS

| | | |
|---|---|---|
| CN | 109323006 A | 2/2019 |
| CN | 210372066 U | 4/2020 |
| JP | 2005037016 A | 2/2005 |
| JP | 2016065595 A | 4/2016 |

* cited by examiner

ELECTRONIC EXPANSION VALVE

CROSS-REFERENCE TO RELATED APPLICATION

The present invention is a national stage application of International Patent Application No. PCT/CN2020/090039, which is filed on May 13, 2020, and claims priority to Chinese Patent Application No. 201920903057.0, filed on Jun. 14, 2019 and entitled "Electronic Expansion Valve", the contents of which are hereby incorporated by reference in its entirety.

TECHNICAL FIELD

The present invention relates to a technical field of valves, and in particular, to an electronic expansion valve.

BACKGROUND

An electronic expansion valve is provided with a rod member for driving a valve head to move and a valve sleeve achieving limiting cooperation between the valve head and the rod member. During production, an end of the rod member needs to be fixedly connected with the valve sleeve. During operation, a circumference direction of the rod member is not easily positioned, which tends to cause poor connection between the rod member and the valve sleeve, thereby affecting a yield of products.

SUMMARY

Some embodiments of the present invention provide an electronic expansion valve, so as to solve a problem of low yield of electronic expansion valves in the art known to inventors.

In order to solve the described problem, some embodiments of the present invention provide an electronic expansion valve, including: a valve body, the valve body having a valve port; a valve head, movably provided in the valve body, the valve head being configured for blocking the valve port; a rod member, the rod member having a first end and a second end opposite to each other, wherein the first end is provided in a cavity of the valve head in a penetrating manner, the second end has a positioning structure, the positioning structure is configured for positioning a circumference of the rod member, the positioning structure is a positioning flat surface, and the positioning flat surface is parallel to an axis of the rod member, the axis of the rod member extends along a extension direction of the rod member; a valve sleeve, provided in the cavity of the valve head, wherein the first end of the rod member is fixedly connected with the valve sleeve, and the valve sleeve is in limiting fit with the valve head; and an elastic member, provided in the cavity of the valve head, wherein one end of the elastic member cooperates with the valve head, and the other end of the elastic member is able to be compressed by the rod member.

In some embodiments, a first channel is provided between the rod member and the valve sleeve, and the first channel and the cavity of the valve head together form a balancing channel penetrating through the valve head.

In some embodiments, the valve head includes a barrel and a limiting ring provided on an inner wall of the barrel, wherein one end of the elastic member is abutted against one side of the limiting ring, the valve sleeve is in limiting fit with the other side of the limiting ring, a second channel is provided between the limiting ring and the rod member, and the first channel is in communication with the second channel.

In some embodiments, the rod member includes a first rod section, a second rod section and a third rod section which are connected in sequence; the second end is located at the third rod section, the first end is located at the first rod section, the first rod section has a cross-sectional area smaller than a cross-sectional area of the second rod section, the first rod section is provided in the limiting ring and the valve sleeve in a penetrating manner, the first channel is provided between an inner wall of the valve sleeve and the first rod section, and the second channel is provided between an inner wall of the limiting ring and the first rod section.

In some embodiments, the first rod section has a radial cross-section which is of arc-shaped.

In some embodiments, a first limiting step is provided on a side wall of the rod member, and an end face of the valve sleeve is abutted against the first limiting step.

In some embodiments, a second limiting step is provided on the side wall of the rod member. The electronic expansion valve further includes: a washer, sleeved on the rod member, wherein the washer is abutted against the second limiting step, and the other end of the elastic member is abutted against the washer.

In some embodiments, the electronic expansion valve further includes: a guide sleeve, provided in the valve body, the valve head being provided in the guide sleeve in a penetrating manner; and a sealing member, the sealing member being provided between the valve head and the guide sleeve.

In some embodiments, the electronic expansion valve further includes: a rotor assembly, the rotor assembly being in drive connection with the rod member.

In some embodiments, the rod member has external threads. The electronic expansion valve further includes: a nut assembly, the nut assembly having internal threads, wherein the external threads are fit with the internal threads.

By applying the technical solutions of some embodiments of the present embodiment, the positioning structure is provided at the second end of the rod member, so that when the rod member and the valve sleeve are connected, a circumference of the rod member can be positioned by means of the positioning structure, and thus a precise connection between the rod member and the valve sleeve can be achieved at a required position, thereby improving a quality of connection between the rod member and the valve sleeve, and further increasing a yield of electronic expansion valves.

BRIEF DESCRIPTION OF THE DRAWINGS

The drawings of the description, constituting a part of some embodiments of the present invention, are used for providing further understanding of some embodiments of the present invention, and the illustrative embodiments of the present invention and illustrations thereof are used for explaining some embodiments of the present invention, rather than constituting inappropriate limitation on some embodiments of the present invention. In the drawings.

Figure 1:
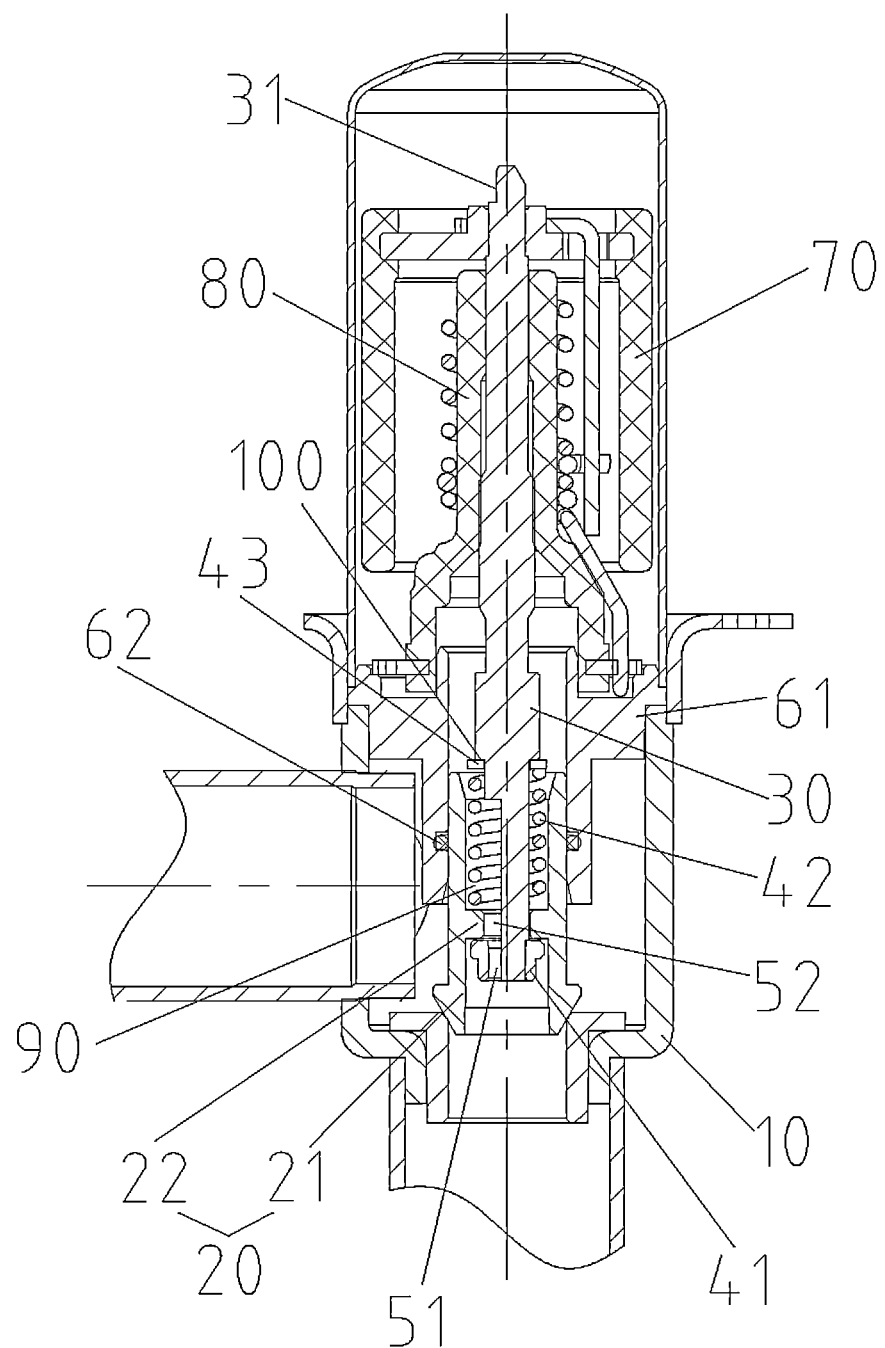
FIG. 1 illustrates a sectional view of an electronic expansion valve provided in some embodiments of the present invention.
Figure 2:
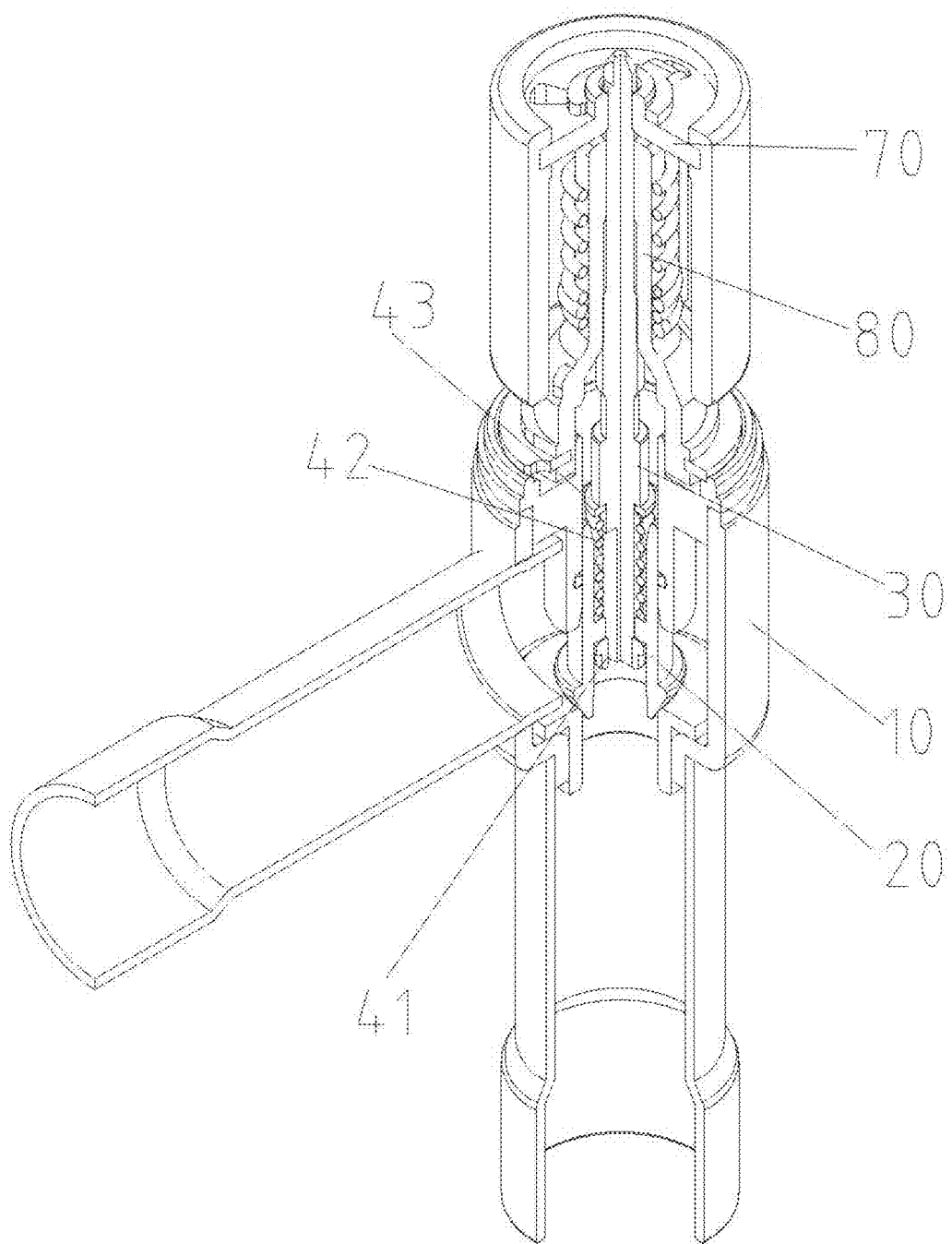
FIG. 2 illustrates a perspective view of the electronic expansion valve in FIG. 1.
Figure 3:
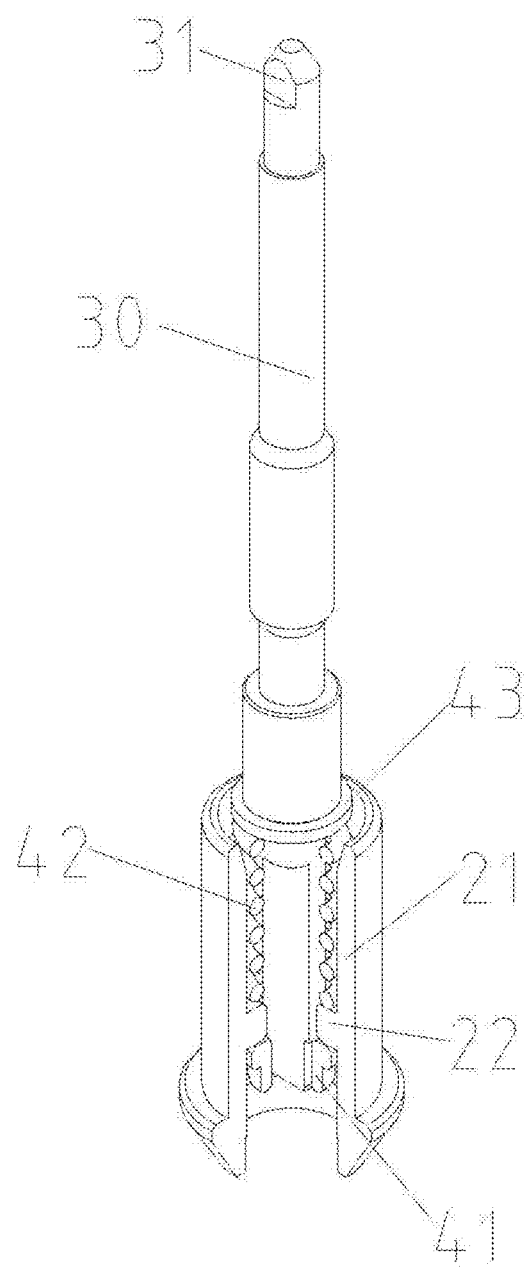
FIG. 3 illustrates an assembly view of a rod member in FIG. 1 with some parts.

The described accompanying drawings include the following reference signs:

10. valve body; 20. valve head; 21. barrel; 22. limiting ring; 30. rod member; 31. positioning structure; 32. first rod section; 33: second rod section; 34: third rod section; 41. valve sleeve; 42. elastic member; 43. washer; 51. first channel; 52. second channel; 61. guide sleeve; 62. sealing member; 70. rotor assembly; 80. nut assembly; 90. balancing channel; 100. second limiting step.

DETAILED DESCRIPTION OF THE EMBODIMENTS

The technical solutions in the embodiments of the present invention will be clearly and completely described below with reference to the accompanying drawings in the embodiments of the present invention. Obviously, the embodiments as described are only parts of embodiments rather than all the embodiments of the present invention. The following description of at least one exemplary embodiment is merely illustrative in nature and is in no way intended to limit some embodiments of the present invention and any applications or uses thereof. On the basis of the embodiments in the present invention, all other embodiments obtained by a person of ordinary skill in the art without inventive effort shall all belong to the scope of protection of the present invention.

As shown in FIG. 1 to FIG. 4, some embodiments of the present invention provide an electronic expansion valve, including: a valve body 10, the valve body 10 having a valve port; a valve head 20, movably provided in the valve body 10, the valve head 20 being configured for blocking the valve port; a rod member 30, the rod member 30 having a first end and a second end opposite to each other, wherein the first end is provided in a cavity of the valve head 20 in a penetrating manner, the second end has a positioning structure 31, the positioning structure 31 is configured for positioning a circumference of the rod member 30, the positioning structure 31 is a positioning flat surface, and the positioning flat surface is parallel to an axis of the rod member 30, the axis of the rod member 30 extends along a extension direction of the rod member 30; a valve sleeve 41, provided in the cavity of the valve head 20, wherein the first end of the rod member 30 is fixedly connected with the valve sleeve 41, and the valve sleeve 41 is in limiting cooperated with the valve head 20; and an elastic member 42, provided in the cavity of the valve head 20, wherein one end of the elastic member 42 is fitted with the valve head 20, and the other end of the elastic member 42 is able to be compressed by the rod member 30.

By applying the technical solution of the present embodiment, the positioning structure 31 is provided at the second end of the rod member 30, so that when the rod member 30 and the valve sleeve 41 are connected, a circumference of the rod member 30 can be positioned by means of the positioning structure 31, and thus a precise connection between the rod member 30 and the valve sleeve 41 can be achieved at a required position, thereby improving a quality of connection between the rod member 30 and the valve sleeve 41, and further increasing a yield of electronic expansion valves. In this embodiment, the first end of the rod member 30 is able to be connected with the valve sleeve 41 by welding.

In some embodiments, a first channel 51 is provided between the rod member 30 and the valve sleeve 41, and the first channel 51 and the cavity of the valve head 20 together form a balancing channel 90 penetrating through the valve head 20. By means of the balancing channel 90 which is formed by the first channel 51 and the cavity of the valve head 20 and penetrates through the valve head 20, pressures at two end regions of the valve head 20 can be kept balanced. By providing the balancing channel 90, the fluid pressures at two end regions of the valve head 20 can be consistent, and in this way, after the valve head 20 blocks the valve port, loose blocking caused by a pressure difference between two sides of the valve head 20 can be avoided. Moreover, this facilitates the opening of the valve port.

In some embodiments, the positioning structure 31 is a positioning flat surface, the positioning flat surface is parallel to an axis of the rod member 30. The positioning structure 31 being set as a positioning flat surface both facilitates machining and facilitates positioning of the rod member 30. The positioning structure 31 can be machined by cutting a part of material at the second end of the rod member 30. During production, a tool or a clamp can be used to fit the positioning flat surface, so as to achieve positioning. In some embodiments, a plurality of positioning flat surfaces are provided.

In solutions not shown, the positioning structure 31 can also be set as structures such as a spline, a groove and a hole.

In some embodiments, the valve head 20 includes a barrel 21 and a limiting ring 22 provided on an inner wall of the barrel 21; one end of the elastic member 42 is abutted against one side of the limiting ring 22, the valve sleeve 41 is in limiting fit with the other side of the limiting ring 22, a second channel 52 is provided between the limiting ring 22 and the rod member 30, and the first channel 51 is in communication with the second channel 52. By providing the limiting ring 22, the elastic member 42 is abutted against the limiting ring 22, so that the elastic member 42 applies an elastic force to the valve head 20. The second channel 52 is provided between the limiting ring 22 and the rod member 30, and the second channel 52 is in communication with the first channel 51, thereby maintaining pressures at two end regions of the valve head 20 balanced. The second channel 52 belongs to a part of the cavity of the valve head 20.

Figure 4:
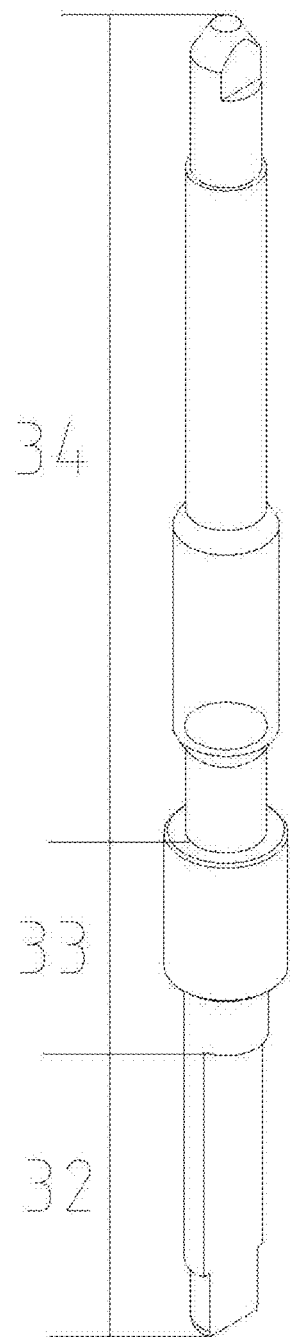
FIG. 4 illustrates a structural schematic view of the rod member in FIG. 1.

As shown in FIG. 4, the rod member 30 includes a first rod section 32, a second rod section 33 and a third rod section 34 which are connected in sequence; the second end is located at the third rod section 34, the first end is located at the first rod section 32, the cross-sectional area of the first rod section 32 is smaller than a cross-sectional area of the second rod section 33, the first rod section 32 is provided in the limiting ring 22 and the valve sleeve 41 in a penetrating manner, the first channel 51 is provided between an inner wall of the valve sleeve 41 and the first rod section 32, and the second channel 52 is provided between an inner wall of the limiting ring 22 and the first rod section 32. The arrangement above facilitates forming of the first channel 51 and the second channel 52. The use of this arrangement manner facilitates machining the balanced channel.

In particular, in the present embodiment, the first rod section 32 has a radial cross-section which is of arc-shaped. During machining, an integrally formed rod is used as the rod member 30, and the first rod section 32 is manufactured by axially cutting off a part of one end of the rod member 30, which facilitates machining and has a low manufacturing cost.

In some embodiments, a first limiting step is provided on a side wall of the rod member 30, and an end face of the valve sleeve 41 is abutted against the first limiting step. By providing the first limiting step, the valve sleeve 41 and the rod member 30 can be axially limited.

In some embodiments, a second limiting step 100 is provided on the side wall of the rod member 30. The electronic expansion valve further includes: a washer 43, sleeved on the rod member 30, wherein the washer 43 is abutted against the second limiting step 100, and the other end of the elastic member 42 is abutted against the washer 43. The axial direction of the washer 43 can be limited by the second limiting step 100. The axial direction of the elastic member 42 can be limited by the washer 43, and the wear of the rod member 30 can be reduced.

In some embodiments, the electronic expansion valve further includes: a guide sleeve 61, provided in the valve body 10, the valve head 20 being provided in the guide sleeve 61 in a penetrating manner; and a sealing member 62, the sealing member 62 being provided between the valve head 20 and the guide sleeve 61.

The valve head 20 can be guided by means of the guide sleeve 61. The sealing member 62 can improve the sealing performance and avoid internal leakage. Specifically, an annular groove is provided on an inner wall of the guide sleeve 61, the annular sealing member 62 is provided in the annular groove, and an outer wall of the valve head 20 can be sealed by means of the annular sealing member 62, so as to ensure the sealing performance of the electronic expansion valve.

In some embodiments, the electronic expansion valve further includes: a rotor assembly 70, the rotor assembly 70 being in drive connection with the rod member 30. The rotor assembly 70 can drive the rod member 30 to move. The rotor assembly 70 is welded to the second end of rod member 30.

In some embodiments, the rod member 30 has external threads. The electronic expansion valve further includes: a nut assembly 80, the nut assembly 80 having internal threads, wherein the external threads are fit the internal threads. By fitting of the rotor assembly 70, the nut assembly 80 and the rod member 30, rotation and up-and-down movement of the rod member 30 can be achieved.

By applying the technical solutions in some embodiments of the present invention, the positioning structure 31 is provided at the second end of the rod member 30, so that when the rod member 30 and the valve sleeve 41 are connected, a circumference of the rod member 30 can be positioned by means of the positioning structure 31, and thus a precise connection between the rod member 30 and the valve sleeve 41 can be achieved at a required position, thereby improving the quality of connection between the rod member 30 and the valve sleeve 41, and further increasing a yield of electronic expansion valves. Furthermore, by means of the balancing channel 90 which is formed by the first channel 51 and the cavity of the valve head 20 and penetrates through the valve head 20, the pressures at two end regions of the valve head 20 can be kept balanced. By providing the balancing channel 90, the fluid pressures at two end regions of the valve head 20 can be consistent, and in this way, after the valve head 20 blocks the valve port, loose blocking caused by a pressure difference between two sides of the valve head 20 can be avoided. Moreover, this facilitates the opening of the valve port. In some embodiments, the first end of the rod member 30 can be connected with the valve sleeve 41 by welding.

The content above only relates to preferred embodiments of the present invention, and is not intended to limit some embodiments of the present invention. For a person skilled in the art, some embodiments of the present invention can have various modifications and changes. Any modifications, equivalent replacements, improvements and the like made within the spirit and principle of some embodiments of the present invention shall fall within the scope of protection of the present invention.

What is claimed is:

1. An electronic expansion valve, comprising:
   a valve body, the valve body having a valve port;
   a valve head, movably provided in the valve body, the valve head being configured for blocking the valve port;
   a rod member, the rod member having a first end and a second end opposite to each other, wherein the first end is provided in a cavity of the valve head in a penetrating manner, the second end has a positioning structure, the positioning structure is configured for positioning a circumference of the rod member, the positioning structure is a positioning flat surface, and the positioning flat surface is parallel to an axis of the rod member, the axis of the rod member extends along a extension direction of the rod member;
   a valve sleeve, provided in the cavity of the valve head, wherein the first end of the rod member is fixedly connected with the valve sleeve, and the valve sleeve is in limiting fit with the valve head; and
   an elastic member, provided in the cavity of the valve head, wherein one end of the elastic member cooperates with the valve head, and the other end of the elastic member is able to be compressed by the rod member;
   wherein a first channel is provided between the rod member and the valve sleeve, and the first channel and the cavity of the valve head together form a balancing channel penetrating through the valve head;
   wherein the valve head comprises a barrel and a limiting ring provided on an inner wall of the barrel, wherein one end of the elastic member is abutted against one side of the limiting ring, the valve sleeve is configured to in abutment with the other side of the limiting ring, a second channel is provided between the limiting ring and the rod member, and the first channel is in communication with the second channel;
   wherein the rod member comprises a first rod section, a second rod section and a third rod section which are connected in sequence; the second end is located at the third rod section, the first end is located at the first rod section, the first rod section has a cross-sectional area smaller than a cross-sectional area of the second rod section, the first rod section is provided in the limiting ring and the valve sleeve in a penetrating manner, the first channel is provided between an inner wall of the valve sleeve and the first rod section, and the second channel is provided between an inner surface of the limiting ring and the first rod section.

2. The electronic expansion valve according to claim 1, wherein the first rod section has a radial cross-section which is of arc-shaped.

3. The electronic expansion valve according to claim 1, wherein a first limiting step is provided on a side wall of the rod member, and an end face of the valve sleeve is abutted against the first limiting step.

4. The electronic expansion valve according to claim 1, wherein a second limiting step is provided at a side wall of the rod member, and the electronic expansion valve further comprises:
   a washer, sleeved on the rod member, wherein the washer is abutted against the second limiting step, and the other end of the elastic member is abutted against the washer.

5. The electronic expansion valve according to claim 1, wherein the electronic expansion valve further comprises:
- a guide sleeve, provided in the valve body, the valve head being provided in the guide sleeve in a penetrating manner; and
- a sealing member, the sealing member being provided between the valve head and the guide sleeve.

6. The electronic expansion valve according to claim 1, wherein the electronic expansion valve further comprises:
- a rotor assembly, the rotor assembly being in drive connection with the rod member.

7. The electronic expansion valve according to claim 1, wherein the rod member has external threads, and the electronic expansion valve further comprises:
- a nut assembly, the nut assembly having internal threads, wherein the external threads are fit with the internal threads.

* * * * *